United States Patent
Govari et al.

(10) Patent No.: US 6,177,792 B1
(45) Date of Patent: Jan. 23, 2001

(54) MUTUAL INDUCTION CORRECTION FOR RADIATOR COILS OF AN OBJECTS TRACKING SYSTEM

(75) Inventors: Assaf Govari, Kiriat Haim; Daniel Osadchy, Haifa; Maier Fenster, Petach Tikva, all of (IL)

(73) Assignee: Bisense, Inc., New Brunswick, NJ (US)

( * ) Notice: Under 35 U.S.C. 154(b), the term of this patent shall be extended for 0 days.

(21) Appl. No.: 09/125,544

(22) PCT Filed: Mar. 18, 1997

(86) PCT No.: PCT/IL97/00100

§ 371 Date: Mar. 19, 1999

§ 102(e) Date: Mar. 19, 1999

(87) PCT Pub. No.: WO97/36143

PCT Pub. Date: Oct. 2, 1997

Related U.S. Application Data (60) Provisional application No. 60/014,084, filed on Mar. 26, 1996.

(51) Int. Cl.[7] ............................ G01B 7/004; G01R 33/025
(52) U.S. Cl. ............................ 324/207.12; 324/207.17
(58) Field of Search .................. 324/207.12, 207.17, 324/219, 220, 222, 225, 228, 229, 232, 233, 236–243, 260; 342/417, 448; 702/150

(56) References Cited

U.S. PATENT DOCUMENTS

| | | | |
|---|---|---|---|
| 3,644,825 | 2/1972 | Davis, Jr. et al. | 324/207.26 |
| 3,868,565 | 2/1975 | Kuipers | 324/207.26 |
| 4,017,858 | 4/1977 | Kuipers | 342/350 |
| 4,054,881 | 10/1977 | Raab | 342/448 |
| 4,560,930 | 12/1985 | Kouno | 324/207.17 |
| 4,613,866 | 9/1986 | Blood | 342/448 |
| 4,642,786 | 2/1987 | Hansen | 702/153 |
| 4,710,708 | 12/1987 | Rorden | 324/207.26 |
| 4,849,692 | 7/1989 | Blood | 324/207.26 |
| 5,068,608 | 11/1991 | Clark, Jr. | 324/220 |
| 5,211,165 | 5/1993 | Dumoulin | 600/410 |
| 5,253,647 | 10/1993 | Takahashi et al. | 600/424 |
| 5,383,874 | 1/1995 | Jackson et al. | 606/1 |
| 5,391,199 | 2/1995 | Ben-Haim | 607/122 |
| 5,429,132 | 7/1995 | Guy et al. | 600/422 |
| 5,443,489 | 8/1995 | Ben-Haim | 607/115 |
| 5,453,687 | 9/1995 | Zierdt et al. | 324/207.17 |
| 5,558,091 | 9/1996 | Acker et al. | 600/424 |
| 5,577,502 | 11/1996 | Darrow et al. | 600/426 |
| 5,715,822 | 2/1998 | Watkins et al. | 600/422 |
| 5,729,129 | 3/1998 | Acker | 324/207.12 |

FOREIGN PATENT DOCUMENTS

| | | |
|---|---|---|
| 0 339 723 A | 11/1989 | (EP) . |
| WO 94/04938 | 3/1994 | (WO) . |
| WO 94/23647 | 10/1994 | (WO) . |
| WO 96/41119 | 12/1996 | (WO) . |
| WO 97/29685 | 8/1997 | (WO) . |
| WO 97/29709 | 8/1997 | (WO) . |
| WO 97/32179 | 9/1997 | (WO) . |

Primary Examiner—Jay Patidar
(74) Attorney, Agent, or Firm—Louis J. Capezzuto (57) ABSTRACT

Apparatus for generating magnetic fields, including a plurality of radiator coils (22, 24, 26) and driver circuitry (30, 32, 33) coupled thereto, which drives the coils so as to generate magnetic fields at a plurality of driving frequencies, wherein each of the plurality of radiator coils (22, 24, 26) generates a field substantially only at a single, respective driving frequency. Preferably circuitry is associated with at least one of the plurality of radiator coils (22, 24, 26) for substantially eliminating magnetic fields generated by the other coils.

15 Claims, 4 Drawing Sheets

MUTUAL INDUCTION CORRECTION FOR RADIATOR COILS OF AN OBJECTS TRACKING SYSTEM

This application claims the benefit of U.S. Provisional Patent Application No. 60/014,084, filed Mar. 26, 1996, which is incorporated herein by reference.

FIELD OF THE INVENTION

The present invention relates generally to apparatus for generating and detecting electromagnetic fields, and specifically to non-contact, electromagnetic methods and devices for tracking the position and orientation of an object.

BACKGROUND OF THE INVENTION

Non-contact electromagnetic tracking systems are well known in the art, with a wide range of applications.

For example, U.S. Pat. No. 4,054,881 describes a tracking system using three coils to generate electromagnetic fields in the vicinity of the object. The fields generated by these three coils are distinguished from one another by open loop multiplexing of time, frequency or phase. The signal currents flowing in three orthogonal sensor coils are used to determine the object's position, based on an iterative method of computation.

U.S. Pat. No. 5,391,199, filed Jul. 20, 1993, which is assigned to the assignee of the present application and whose disclosure is incorporated herein by reference, describe a system for generating three-dimensional location information regarding a medical probe or catheter. A seconsr coil is placed in the catheter and generates signals in response to externally applied magnetic fields. The magnetic fields are generated by three radiator coils, fixed to an external reference frame in known, mutually spaced locations. The amplitudes of the signals generated in response to each of the radiator coil fields are detected and used to compute the location of the sensor coil. Each radiator coil is preferably driven by driver circuitry to generate a field at a known frequency, distinct from that of other radiator coils, so that the signals generated by the sensor coil may be separated by frequency into components corresponding to the different radiator coils.

Unpublished PCT patent application No. PCT/US95/01103, filed Jan. 24, 1995, which is assigned to the assignee of the present application and whose disclosure is incorporated herein by reference, describes a system that generates six-dimensional position and orientation information regarding the tip of a catheter. This system uses a plurality of non-concentric sensor coils adjacent to a locatable site in the catheter, for example near its distal end, and a plurality of radiator coils fixed in an external reference frame. These coils generate signals in response to magnetic fields generated by the radiator coils, which signals allow for the computation of six location and orientation coordinates. As in the case of the '539 patent application described above, the radiator coils operate simultaneously at different frequencies, for example at 1000, 2000 and 3000 Hz, respectively.

The above tracking systems rely on separation of position-responsive signals into frequency components, wherein each such component is assumed to correspond uniquely to a single radiator coil, in a known position, radiating in a narrow, well-defined frequency band. In practice, however, the radiator coils also generate magnetic fields at the frequencies outside the desired bands, for example due to mutual inductance effects. These mutually-induced fields lead to errors in determining the position of the object being tracked.

SUMMARY OF THE INVENTION

It is an object of the present invention to provide improved electromagnetic radiator coils and driver circuitry therefor, for use in conjunction with object tracking systems, so as to increase the accuracy of object tracking.

It is a further object of the present invention to provide magnetic field generator coils and associated driver circuitry that generate fields of having narrow bandwidths in the frequency domain.

In one aspect of the present invention, narrowed field bandwidth is achieved by eliminating mutual inductance effects among a plurality of coils, which generate magnetic fields at different frequencies.

Still a further object of the present invention is to provide a method for improving the accuracy of a position determined by an object tracking system, by correcting the position determination so as to account for mutual inductance effects.

In preferred embodiments of the present invention, a plurality of radiator coils generate magnetic fields at a plurality of different respective driving frequencies.

In some preferred embodiments of the present invention, one or more additional shimming coils are adjacent to each of the radiator coils. Preferably the shimming coils are interwound with windings of the radiator coils. The shimming coils of each radiator coil are driven by driver circuitry so as to generate magnetic fields that are substantially equal in amplitude and frequency, and opposite in direction, to magnetic field components induced along the axis of that radiator coil by other radiator coils.

In other preferred embodiments of the present invention, driver circuitry is associated with each of the coils and generates electrical driver currents therein, wherein for each coil the current comprises a major component at the coil's respective driving frequency, and minor components at other frequencies. The minor components are substantially equal in amplitude and frequency and 180° out of phase with currents induced in the coil due to magnetic fields generated by other radiator coils, so as to substantially cancel the effect of the induced currents.

In one such preferred embodiment of the present invention, driver circuitry includes sensing apparatus, which measures the amplitude, frequency and phase of induced currents in a coil. The driver circuitry further includes an adaptive current supply, which receives the amplitude, frequency and phase data measured by the sensing apparatus, and generates the out-of-phase minor current components to substantially cancel the effect of the induced currents.

In still other preferred embodiments of the present invention, driver circuitry comprises ideal current sources, which function to maintain a constant current in each of the coils at its fixed, respective driving frequency.

In other preferred embodiments of the present invention, an object tracking system comprises one or more sensor coils adjacent to a locatable point on an object being tracked, and a plurality of radiator coils, which generate magnetic fields when driven by driver circuitry at a plurality of different respective driving frequencies in a vicinity of the object. The sensor coils generate signals responsive to the magnetic fields, which signals are received by signal processing circuitry and analyzed by a computer or other processor. The signals include position signal components responsive to the magnetic fields generated by the radiator coils at their respective driving frequencies, and parasitic signal components responsive to magnetic fields generated due to mutual inductance among the radiator coils. The computer processes the signals to separate the position signal components from the parasitic components, preferably using an iterative method, as described below, and uses the position signal components to determine the position of the object.

In one such preferred embodiment of the present invention, the signals, including position components and parasitic components, are used to compute approximate location and orientation coordinates of the object. The strengths of magnetic fields generated at this location by the radiator coils due to mutual inductance effects among the coils are then calculated theoretically, and are used to estimate theoretical strengths of the parasitic components. Corrected signals are calculated by subtracting these theoretical parasitic component strengths from the signals, and these corrected signals are used to calculate corrected location and orientation of the object. These steps are repeated iteratively until the calculation of the corrected location and orientation converges.

In some preferred embodiments of the present invention, mutual inductances among radiator coils in an object tracking system are determined by empirical measurement, using methods known in the art. Thus, for example, the mutual inductance of a pair of radiator coils is determined by activating the driver circuitry of a first coil, so as to generate a magnetic field at a driving frequency thereof, and then measuring the electrical current flowing in a second coil. These measured mutual inductances are then used to estimate the theoretical strengths of the parasitic components for calculation of the corrected signals, in accordance with the method described above. Alternatively, the measured mutual inductances may be used in controlling driver circuitry for generating electrical driver currents 180° out of phase with mutually induced currents.

There is thus provided, in accordance with a preferred embodiment of the present invention, apparatus for generating magnetic fields, comprising a plurality of radiator coils and driver circuitry coupled thereto, which drives the coils so as to generate magnetic fields at a plurality of driving frequencies, wherein each of the plurality of radiator coils generates a field substantially only at a single, respective driving frequency.

Preferably the apparatus for generating magnetic fields comprises circuitry associated with at least one of said plurality of radiator coils for substantially eliminating magnetic fields generated by the at least one coil in response to fields generated by the other coils.

The circuitry for eliminating magnetic fields preferably comprises one or more shimming coils, which are preferably interwound with the at least one of said plurality of radiator coils. Furthermore, the driver circuitry preferably drives one of the one or more shimming coils associated with the at least one of said plurality of radiator coils at the respective driving frequency of another one of said plurality of radiator coils.

Preferably the circuitry further includes a current analyzer, coupled to the adaptive current supply, wherein the current analyzer measures parasitic electrical current flowing in the at least one of said plurality of radiator coils at the respective driving frequency of another one of said plurality of radiator coils, and causes the adaptive current supply to adjust the generated current so as to minimize the parasitic electrical current.

There is further provided, in accordance with a preferred embodiment of the present invention, a method for generating magnetic field having a desired narrow frequency band, comprising: driving a radiator coil with electrical current at the desired frequency; analyzing the current flowing in the coil to measure induced current components at one or more undesired frequencies; and adaptively driving the radiator coil with correction current components at the one or more undesired frequencies, wherein the correction current components are substantially equal in amplitude and opposite in phase to the induced current components measured at the respective one or more undesired frequencies.

There is further provided, in accordance with a preferred embodiment of the present invention, a method for tracking an object, comprising generating a plurality of magnetic fields having a plurality of respective desired narrow frequency bands, in accordance with the preceding method, in a vicinity of an object being tracked; placing one or more sensor coils at a locatable site on the object; receiving signals generated by the sensor coils in response to the magnetic fields; and analyzing the signals to determine position and orientation coordinates of the object.

There is further provided, in accordance with a preferred embodiment of the present invention, a method for tracking an object, comprising: driving a plurality of radiator coils with electrical currents at a plurality of respective frequencies, so as to generate magnetic fields in a vicinity of an object being tracked; placing one or more sensor coils at a locatable site on the object; receiving signals generated by the sensor coils in response to the magnetic fields; analyzing the signals to determine uncorrected position and orientation coordinates of the object, and correcting the position and orientation coordinates to account for errors due to mutual inductance among the plurality of radiator coils.

Preferably, position and orientation coordinates are corrected by the steps of: determining parasitic magnetic fields that would be generated at the uncorrected position of the object due to mutual inductance; computing parasitic signal components that would be generated by the sensor coils in response to the parasitic magnetic fields; calculating corrected signals by subtracting the parasitic signal components from the signals received from the sensor coils; and analyzing the corrected signals to determine corrected position and orientation coordinates.

Preferably, determining the parasitic magnetic fields comprises analyzing the current flowing in the plurality of radiator coils to measure induced current components at undesired frequencies.

Alternatively, determining the parasitic magnetic fields comprises calculating theoretically the mutual inductance among the plurality of radiator coils.

There is therefore provided, in accordance with a preferred embodiment of the present invention, apparatus for generating magnetic fields, including:
  a plurality of radiator coils; and
  driver circuitry coupled thereto, which drives the coils so as to generate magnetic fields at a plurality of driving frequencies,
  wherein each of the plurality of radiator coils generates a field substantially only at a single, respective driving frequency.

Preferably the apparatus includes circuitry associated with at least one of the plurality of radiator coils for substantially eliminating magnetic fields generated by the at least one coil in response to fields generated by the other coils. This circuitry preferably includes one or more shimming coils, which are preferably interwound with the at least one of said plurality of radiator coils.

Preferably the driver circuitry further drives one of the one or more shimming coils associated with the at least one of the plurality of radiator coils at the respective driving frequency of another one of the plurality of radiator coils.

Preferably the circuitry for eliminating includes an adaptive current supply, which generates electrical current in the at least one of the plurality of radiator coils at the respective driving frequency of another one of the plurality of radiator coils.

Preferably the circuitry for eliminating further includes a current analyzer, coupled to the adaptive current supply, which current analyzer measures parasitic electrical current flowing in the at least one of the plurality of radiator coils at the respective driving frequency of another one of the plurality of radiator coils, and causes the adaptive current supply to adjust the generated current so as to minimize the parasitic electrical current.

Preferably the driver circuitry is adapted to maintain a constant current in each of the plurality of radiator coils at the single, respective driving frequency thereof.

There is further provided, in accordance with a preferred embodiment of the present invention, a method for generating a magnetic field having a desired narrow frequency band, including the following steps:

driving a radiator coil with electrical current at a frequency in the desired narrow frequency band;

analyzing the current flowing in the coil to measure inducted current components at one or more undesired frequencies; and adaptively driving the radiator coil with correction current components at the one or more undesired frequencies, wherein the correction current components are substantially equal in amplitude and opposite in phase to the induced current components measured at the respective one or more undesired frequencies.

There is also provided, in accordance with a preferred embodiment of the present invention, a method for tracking an object, including the following steps:

generating a plurality of magnetic fields having a plurality of respective desired narrow frequency bands, in accordance with the preceding method, in a vicinity of an object being tracked;

placing one or more sensor coils at a locatable site on the object;

receiving signals generated by the sensor coils in response to the magnetic fields; and analyzing the signals to determine position and orientation coordinates of the object.

There is further provided, in accordance with a preferred embodiment of the present invention, a method for tracking an object including the following steps:

driving a plurality of radiator coils with electrical currents at a plurality of respective frequencies, so as to generate magnetic fields in a vicinity of an object being tracked;

placing one or more sensor coils at a locatable site on the object;

receiving signals generated by the sensor coils in response to the magnetic fields;

analyzing the signals to determine uncorrected position and orientation coordinates of the object; and correcting the position and orientation coordinates to account for errors due to mutual inductance among the plurality of radiator coils.

Preferably the position and orientation coordinates are corrected by the steps of:

determining parasitic magnetic fields that would be generated at the uncorrected position of the object due to mutual inductance;

computing parasitic signal components that would be generated by the sensor coils in response to the parasitic magnetic fields;

calculating corrected signals by subtracting the parasitic signal components from the signals received from the sensor coils; and analyzing the corrected signals to determine corrected position and orientation coordinates.

Preferably the parasitic magnetic fields are determined by analyzing the current flowing in the plurality of radiator coils to measure induced current components at undesired frequencies.

Alternatively, the parasitic magnetic fields are determined calculating theoretically the mutual inductance among the plurality of radiator coils.

BRIEF DESCRIPTION OF THE DRAWINGS

The present invention will be more fully understood from the following detailed description of the preferred embodiments thereof, taken together with the drawings in which.

DETAILED DESCRIPTION OF PREFERRED EMBODIMENTS

Figure 1:
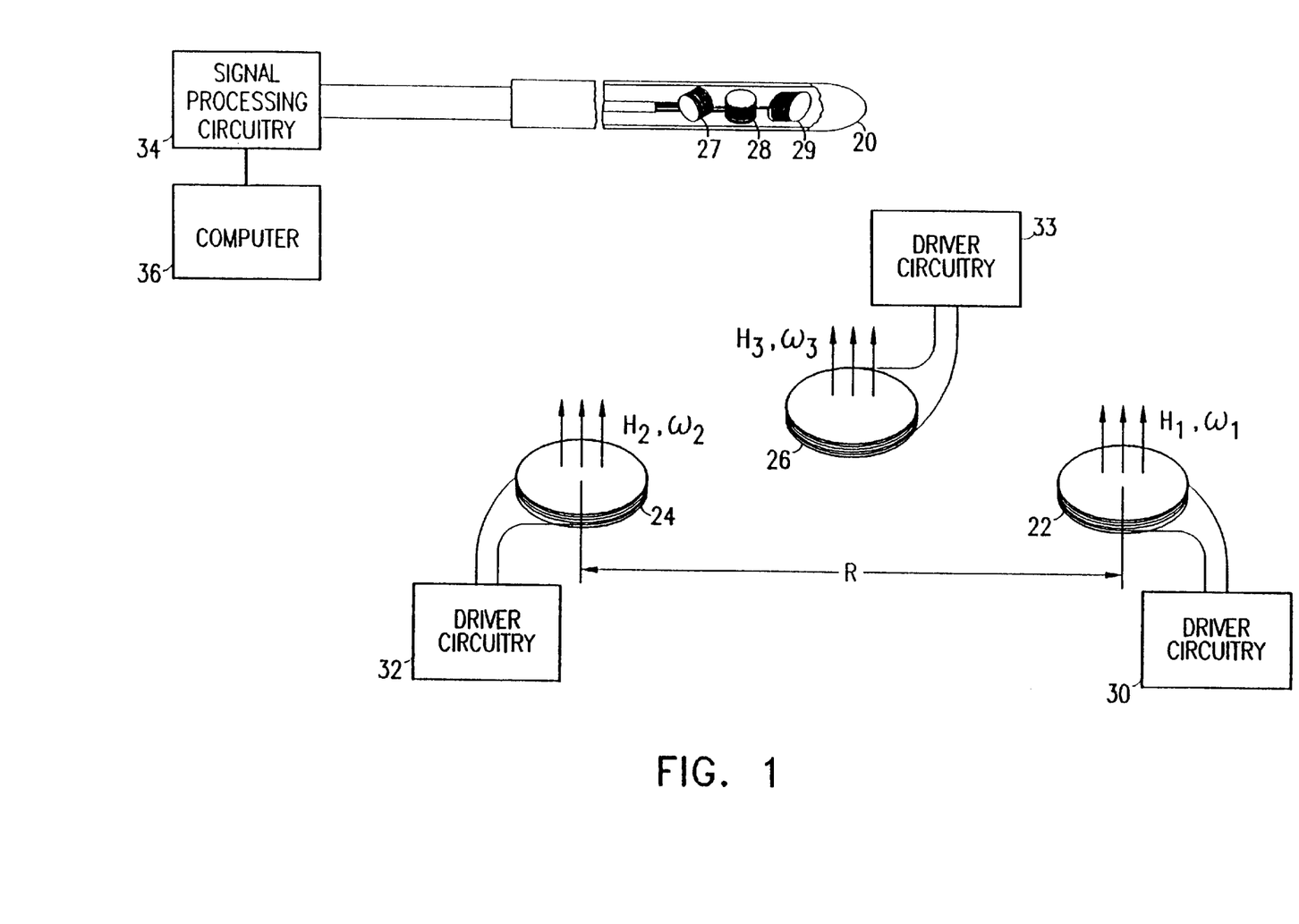
FIG. 1 is a schematic representation of an object tracking system operative in accordance with a preferred embodiment of the present invention.

Reference is now made to FIG. 1, which illustrates schematically a system for tracking a probe 20, such as a catheter for medical use, operative in accordance with preferred embodiment of the present invention. As described in U.S. Pat. No. 5,391,199, to Ben-Haim, and in unpublished PCT patent application No. PCT/US95/01103, filed Jan. 24, 1995, which are assigned to the assignee of the present application and whose disclosures are incorporated herein by reference, the system comprises a plurality of radiator coils 22, 24 and 26. These coils generate respective magnetic fields $H_1$, $H_2$ and $H_3$, at respective frequencies $\omega_1$, $\omega_2$ and $\omega_3$, in the vicinity of probe 20. The probe further includes sensor coils 27, 28 and 29, which generate electrical current signals in response to the magnetic fields, wherein the signals comprise components at frequencies $\omega_1$, $\omega_2$ and $\omega_3$, whose respective amplitudes are dependent on the position and orientation of probe 20.

The system further comprises driver circuitry 30, 32 and 33, coupled to each of the radiator coils, which drives coils 22, 24 and 26 at respective driving frequencies $\omega_1$, $\omega_2$ and $\omega_3$. The signals generated by sensor coils 27, 28 and 29 are preferably processed by signal processing circuitry 34 and then used by computer 36 to calculate position and orientation coordinates of probe 20.

For the sake of clarity, FIG. 1 shows three radiator coils 22, 24 and 26 and three sensor coils 27, 28 and 29 in a probe 20. It will be understood, however, that the present invention is equally applicable to tracking systems comprising two, four or more radiator coils and one, two or more sensor coils. The present invention may be used in tracking other types of objects, as well.

In the absence of mutual inductance effects, the signals generated by sensor coils 27, 28 and 29 at frequency $\omega_1$ are proportional to the amplitude of the time derivative of the projection of magnetic flux due to field $H_1$ at probe 20 along each of the respective axes of the sensor coils. The signals generated at frequencies $\omega_2$ and $\omega_3$ are similarly proportional to the projections of $H_2$ and $H_3$. Since the direction and amplitude of the magnetic field due to a single such radiator coil can be calculated easily using methods known in the art, the sensor coil signals due to a single radiator coil may be directly related to the sensor coil's distance from and orientation relative to the radiator coil.

In practice, however, magnetic field $H_1$ generated by radiator coil 22 is not limited in space to an immediate vicinity of probe 20, but also has a non-zero amplitude in a vicinity of coils 24 and 26. As is well known in the art (see, for example, Lorrain and Corson, *electromagnetic Fields and Waves*, Second Edition, 1970, pages 343–345), the magnetic flux $\Phi_2$ through coil 24 due to current $I_1$ flowing in coil 22 may be expressed as:

$$\Phi_2 M_{12} I_1 \tag{1}$$

wherein $M_{12}$ is the mutual inductance of coils 22 and 24, and the voltage induced in coil 24 will be $$V_{12} = -M_{12} \frac{dI_1}{dt} \tag{2}$$

Assuming coil 24 to have inductance L and zero resistance, the overall voltage in the coil will be $$V_2 = -L \frac{dI_2}{dt} \tag{3}$$

Since driver circuitry 30 and 32 preferably drives coils 22 and 24 with sinusoidal electrical currents at the coils' respective frequencies $\omega_1$ and $\omega_2$, an additional current $I_{12}$ at frequency $\omega_1$ will flow in coil 24, having amplitude given by:

$$I_{12} = \frac{M_{12}\omega_1}{L\omega_2} I_1 \tag{4}$$

Current $I_{12}$ flowing in radiator coil 24 will cause a parasitic magnetic field $H_{12}$ to be generated at frequency $\omega_1$, whose amplitude will be approximately proportional to the ratio $M_{12}/L$ which $\omega_1 \approx \omega_2$. $M_{12}$ depends on geometrical factors and on the number of turns in each of the coils. It can be shown (see, for example J. D. Jackson, *Classical Electrodynamics*, Second Edition, page 263) that for the two coplanar current loops of radius a, mutually spaced by a distance R:

$$M_{12} = \mu \pi a \left[ \left(\frac{a}{R}\right)^3 + \frac{9}{4}\left(\frac{a}{R}\right)^5 + \frac{375}{64}\left(\frac{a}{R}\right)^7 + \cdots \right] \tag{5}$$

For coils 22 and 24 comprising $n_1$ and $n_2$ turns per unit length, respectively, and having substantially identical lengths l, inner radii $r_1$ and outer radii $r_2$, and assuming that the magnetic field $H_1$ is substantially uniform over all the turns of coil 24, we may integrate equation (5) to find the mutual inductance of the coils:

$$M_{12} = \mu \pi n_1 n_2 l^2 R^2 \left[ \frac{1}{5}\left(\frac{r_2^5 - r_1^5}{R^5}\right) + \frac{9}{28}\left(\frac{r_2^7 - r_1^7}{R^7}\right) + \cdots \right] \tag{6}$$

Thus, for example, in a tracking system such as those described in U.S. Pat. No. 5,391,199 and in unpublished PCT patent application No. PCT/US95/01103, wherein coils 22 and 24 have inner radii of 25 mm and outer radii of approximately 60 mm, and are mutually spaced by 39 cm, it will be observed that $I_{12}=0.0025(\omega_1/\omega_2)I_1$, which could lead to an error of 0.5% when $\omega_1=2\omega_2$. Thus, the signals generated by sensor coils 27, 28 and 29 at frequency $\omega_1$ will include both a position signal component due to $H_1$ and a parasitic signal component due to $H_{12}$, which may introduce errors of up to 1% in determination of the position of probe 20. Additional parasitic signal components at frequency $\omega_1$ will be introduced by mutual inductance in coil 26 and any other radiator coils. Similarly, sensor coil signals at frequencies $\omega_2$ and $\omega_3$ will also include parasitic components.

Figure 2:
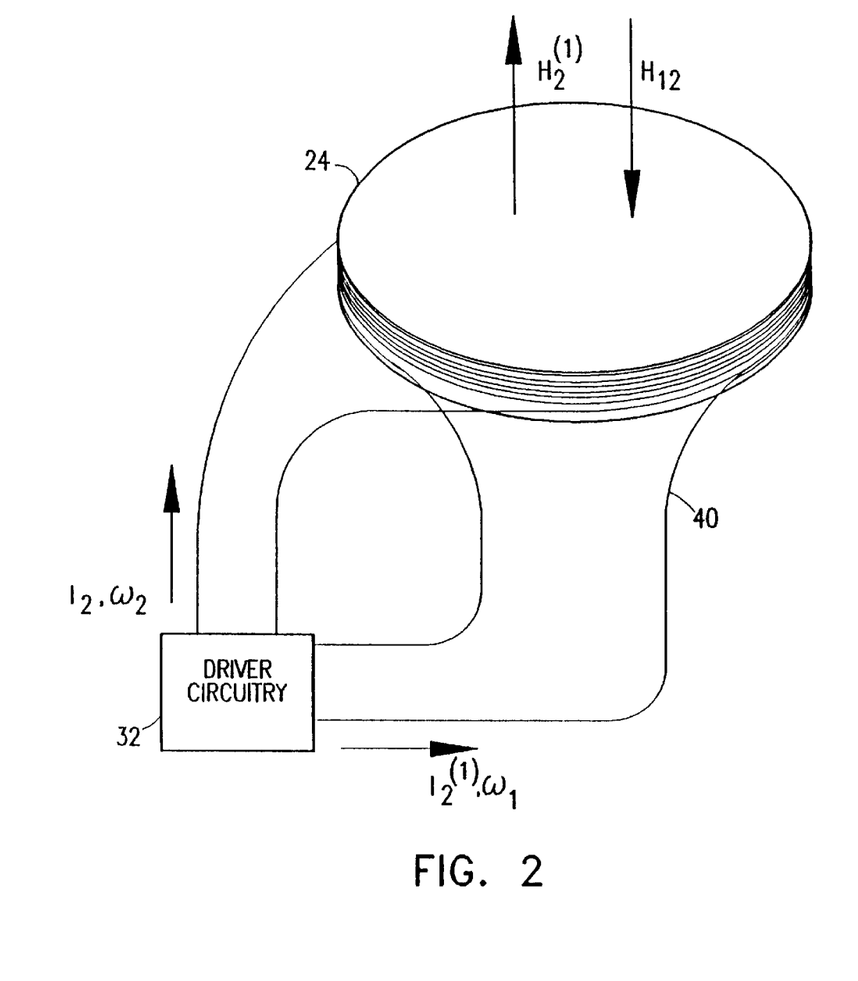
FIG. 2 is a schematic representation of a radiator coil in accordance with a preferred embodiment of the present invention.

For this reason, in a preferred embodiment of the present invention shown in FIG. 2, one or more shimming coils 40 are adjacent to radiator coil 24, and preferably interwound therewith. Driver circuitry 32 drives coil 24 with current $I_2$ at the coil's driving frequency $\omega_2$. circuitry 32 further drives shimming coil 40 with current $I_2^{(1)}$ at frequency $\omega_1$, wherein this current causes a magnetic field $H_2^{(1)}$ to be generated along the axis of coil 24 which is equal in amplitude and 180° out of phase with magnetic field $H_{12}$. Consequently, mutually-induced current $I_{12}$ will be substantially canceled out by an equal and opposite current induced due to field $H_2^{(1)}$.

Although, for the sake of clarity, FIG. 2 and the foregoing explanation relate only to a single shimming coil, driven at a single frequency, it will be understood that in preferred embodiments of the present invention, each of coils 22, 24 and 26 will be interwound with at least one shimming coil, driven with appropriate currents and frequencies so as to substantially cancel out mutually-induced currents due to all other coils.

Figure 3:
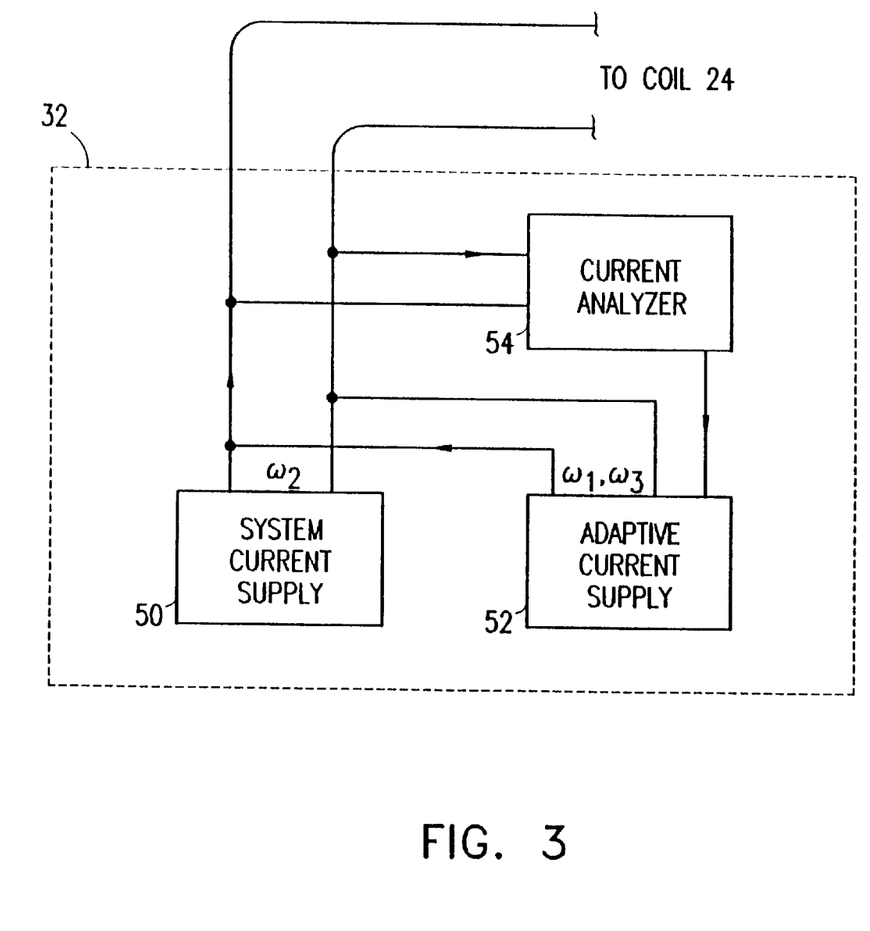
FIG. 3 is a schematic representation of coil driver circuitry in accordance with another preferred embodiment of the present invention.

FIG. 3 illustrates schematically an alternative preferred embodiment of the present invention, wherein driver circuitry 32 is adapted to drive coil 24 so as to substantially cancel mutually induced currents. Circuitry 32 comprises system current supply 50, which drives coil 24 at its driving frequency $\omega_2$, and adaptive current supply 52, which generates current to drive coil 24 at the respective frequencies of coils 22 and 26, $\omega_1$ and $\omega_3$, with amplitudes and phases determined by current analyzer 54. The current analyzer samples the current in coil 24, using methods known in the art, and separates the sampled current into frequency components. Analyzer 54 causes adaptive supply 52 to adjust the amplitudes and phases of the generated $\omega_1$ and $\omega_3$ currents so as to minimize the components sensed at frequencies $\omega_1$ and $\omega_3$ in the sampled current from coil 24. Typically the generated $\omega_1$ and $\omega_3$ currents are substantially equal in amplitude to and 180° out of phase with the mutually induced currents $I_{12}$ and $I_{32}$. It will be understood that coils 22 and 26 are driven by similar adaptive driver circuitry.

In other preferred embodiments of the present invention, signal processing circuitry 34 and computer 36 function to determine amplitudes and phases of the parasitic signal components generated by sensor coils 27, 28 and 29 due to mutual inductance among the radiator coils, and correct the determination of the position of probe 20 to account for the parasitic components.

In one such preferred embodiment of the present invention, the amplitude and phase of the magnetic field due to each of the coils is found using a harmonic detection method. In accordance with this method, the signals are sampled so that an integer number of periods of each of the signals are measured, i.e., $2\pi f_s/\omega = N$, where $f_s$ is the sampling frequency, and N is the number of sampling points. In this way, signal sampling is thus synchronized with the magnetic field frequencies. If N is a small number, then the sampling is preferably synchronized with the magnetic field, and may preferably be synchronized to take place at the peak of the periodic magnetic field. The signals thus obtained at a frequency $\omega$ may be expressed as:

$$U = \frac{2}{N}\sum_{n=0}^{N-1} A\sin(n\omega f_s + \phi)\sin\left(\frac{2\pi n}{N}\right) = A\cos\phi \quad (7)$$

$$V = \frac{2}{N}\sum_{n=0}^{N-1} A\sin(n\omega f_s + \phi)\cos\left(\frac{2\pi n}{N}\right) = A\sin\phi$$

In the presence of mutual inductance, the signals generated by the jth sensor coil comprise frequency components whose respective amplitudes Uij and Vij, at radiator coil frequency $\omega_i$, may be expressed as follows:

$$U_{ij} = A_{ij}\cos\phi_i + \sum_{k\neq i}^{3} A_{ijk}^m \cos\phi_{ik}^m \quad (8)$$

$$V_{ij} = A_{ij}\sin\phi_i + \sum_{k\neq i}^{3} A_{ijk}^m \sin\phi_{ik}^m \quad (9)$$

In equations (8) and (9), Aij and $\phi_i$ represent the amplitude and phase, respectively, of the position signal components received from sensor coil 28 (here identified as the jth sensor coil) at frequency $\omega_i$ due to the magnetic field of the ith radiator coil, disregarding mutual inductance effects. $A_{ijk}^m$ and $\phi_{ik}^m$ are the respective amplitudes and phases of the parasitic signal components generated by the jth sensor coil at frequency $\omega_i$, due to mutual inductance between the ith and kth radiator coils.

Figure 4:
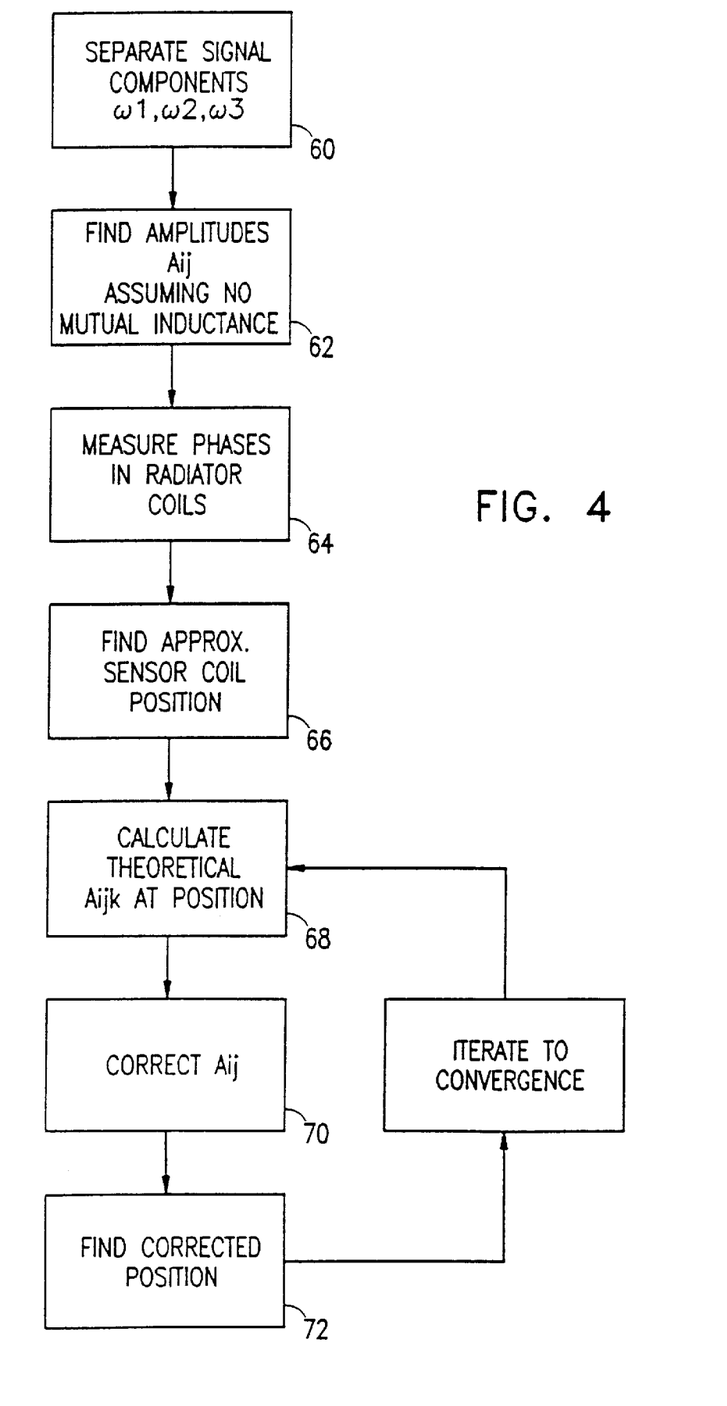
FIG. 4 is a flow chart illustrating schematically a method of object tracking in accordance with a preferred embodiment of the present invention.

In order to correctly determine the position of sensor coils 27, 28 and 29 and probe 20, the signals received from the coil are preferably processed using the method shown in FIG. 4. First (60) the signals are separated into components Uij and Vij at frequencies $\omega_1$, $\omega_2$ and $\omega_3$ using methods known in the art, such as harmonic detection. The amplitudes of these signals Aij are then determined (62), assuming that mutual inductance effects are insignificant, i.e., that all $A_{ijk}^m$ are zero. Phases $\Phi_i$ and $\Phi_{ik}^m$, which are dependent only on the radiator coils, are derived by measuring the respective radiator coil phases (64). The amplitudes Aij are then used to estimate the position and orientation of coils 27, 28 and 29 (66), as described, for example, in unpublished PCT patent application No. PCT/US95/01103.

The theoretical values of $a_{ijk}^m$ are then calculated for the estimated position of the sensor coils (68). To perform this calculation, the parasitic magnetic fields generated due to mutual inductance among the radiator coils, Hik, are determined at the sensor coils' estimated position. These parasitic fields are transformed from the coordinate frame of the radiator coils to that of the sensor coils, based on the projections of the parasitic fields along the respective axes of the sensor coils. The field projections are used to calculate theoretical amplitudes of parasitic signal components generated by the sensor coils, using the relationship:

$$A_{ijk}^m = \sum_{p=1}^{3} M_{jp}\overline{A}_{ipk}^m \quad (10)$$

where the three values of $\overline{A}_{ipk}^m$ are the theoretical signal amplitudes in the radiator coils' frame of reference, and Mjp are the elements of the orientation matrix.

Various methods may be used to determine the amplitude and direction of the parasitic magnetic fields Hik at the position of the sensor coils. In one preferred embodiment of the present invention, mutual inductances among the coils and the resultant magnetic fields are calculated theoretically from geometrical considerations, using methods well known in the art. In an alternative preferred embodiment, the mutual inductance of a pair of radiator coils is determined by activating the driver circuitry of one of the coils, so as to generate a magnetic field at its driving frequency, and then measuring electrical current flowing in the other coil at this frequency. These measured mutual inductances are then used to calculate the resultant parasitic magnetic fields, as explained above.

Finally, the theoretical $A_{ijk}^m$ coefficients are substituted back into equations (8) and (9) to determine corrected values of the nine Aij elements (70), and these values are used to correct the position and orientation coordinates of the probe (72). Steps (68), (70) and (72) are preferably repeated iteratively until the position and orientation coordinates of the probe converge.

It will be understood that while the above method has been described with reference to a system comprising three radiator coils and three sensor coils, it may equally be applied to other electromagnetic object tracking system, using greater or fewer numbers of coils or antennae.

What is claimed is:

1. Apparatus for tracking an object by generating magnetic fields, comprising:
   a plurality of radiator coils;
   driver circuitry coupled thereto, which drives the coils so as to generate magnetic fields at a plurality of driving frequencies,
   wherein each of the plurality of radiator coils generates a field substantially only at a single, respective driving frequency; and
   circuitry associated with at least one of said plurality of radiator coils for substantially eliminating magnetic fields generated by the at least one coil in response to fields generated by the other coils.

2. Apparatus in accordance with claim 1, wherein said circuitry for eliminating comprises one or more shimming coils.

3. Apparatus in accordance with claim 2, wherein the one or more shimming coils are interwound with the at least one of said plurality of radiator coils.

4. Apparatus in accordance with claim 3, wherein the driver circuitry further drives one of the one or more shimming coils associated with the at least one of said plurality of radiator coils at the respective frequency of another one of said plurality of radiator coils.

5. Apparatus in accordance with claim 4, wherein the circuitry for eliminating includes an adaptive current supply.

6. Apparatus in accordance with claim 5, wherein the adaptive current supply generates electrical current in the at least one of said plurality of radiator coils at the respective driving frequency of another one of said plurality of radiator coils.

7. Apparatus in accordance with claim 6, wherein the circuitry for eliminating further includes a current analyzer coupled to the adaptive current supply.

8. Apparatus in accordance with claim 7, wherein the current analyzer measures parasitic electrical current flowing in the at least one of said plurality of radiator coils at the respective driving frequency of another one of said plurality of radiator coils, and causes the adaptive current supply to adjust the generated current so as to minimize the parasitic electrical current.

9. Apparatus in accordance with claim 1, wherein the driver circuitry maintains a constant current in each of the plurality of radiator coils at the single, respective driving frequency thereof.

10. A method for tracking an object by generating a magnetic field having a desired narrow frequency band, comprising:

driving a radiator coil with electrical current at a frequency in the desired narrow frequency band;

analyzing the current flowing in the coil to measure induced current components at one or more undesired frequencies; and adaptively driving the radiator coil with correction current components at the one or more undesired frequencies, wherein the correction current components are substantially equal in amplitude and opposite in phase to the induced current components measured at the respective one or more undesired frequencies.

11. A method in accordance with claim 10, comprising:

generating a plurality of magnetic fields having a plurality of respective desired narrow frequency bands in a vicinity of an object being tracked;

placing one or more sensor coils at a locatable site on the object;

receiving signals generated by the sensor coils in response to the magnetic fields; and analyzing the signals to determine position and orientation coordinates of the object.

12. A method for tracking an object, comprising:

driving a plurality of radiator coils with electrical currents at a plurality of respective frequencies, so as to generate magnetic fields in a vicinity of an object being tracked;

placing one or more sensor coils at a locatable site on the object;

receiving signals generated by the sensor coils in response to the magnetic fields;

analyzing the signals to determine uncorrected position and orientation coordinates of the object; and correcting the position and orientation coordinates to account for errors due to mutual inductance among the plurality of radiator coils.

13. A method in accordance with claim 12, wherein the position and orientation coordinates are corrected by the steps of:

determining parasitic magnetic fields that would be generated at the uncorrected position of the object due to mutual inductance;

computing parasitic signal components that would be generated by the sensor coils in response to the parasitic magnetic fields;

calculating corrected signals by subtracting the parasitic signal components from the signals received from the sensor coils; and analyzing the corrected signals to determine corrected position and orientation coordinates.

14. A method in accordance with claim 13, wherein determining the parasitic magnetic fields comprises analyzing the current flowing in the plurality of radiator coils to measure induced current components at undesired frequencies.

15. A method in accordance with claim 13, wherein determining the parasitic magnetic fields comprises calculating theoretically the mutual inductance among the plurality of radiator coils.

* * * * *

UNITED STATES PATENT AND TRADEMARK OFFICE
CERTIFICATE OF CORRECTION

PATENT NO. : 6,177,792 B1  
DATED : January 23, 2001  
INVENTOR(S) : Assaf Govari, Daniel Oscadcy, and Maier Fenster Page 1 of 1

It is certified that error appears in the above-identified patent and that said Letters Patent is hereby corrected as shown below:

Column 10, claim 10,
Line 58, please insert -- driving -- between "respective" and "frequency"

Signed and Sealed this

Twenty-fifth Day of September, 2001

Attest:

Nicholas P. Godici

NICHOLAS P. GODICI
*Attesting Officer*   *Acting Director of the United States Patent and Trademark Office*

UNITED STATES PATENT AND TRADEMARK OFFICE
CERTIFICATE OF CORRECTION

PATENT NO. : 6,177,792 B1
DATED : January 23, 2001
INVENTOR(S) : Govari et al.

It is certified that error appears in the above-identified patent and that said Letters Patent is hereby corrected as shown below:

Title Page,
Item [73], is listed as "(73) Bisense, Inc." should be -- [73] Biosense, Inc. --

Signed and Sealed this

Thirty-first Day of December, 2002

JAMES E. ROGAN
*Director of the United States Patent and Trademark Office*